United States Patent [19]

Halters et al.

[11] Patent Number: 4,561,348
[45] Date of Patent: Dec. 31, 1985

[54] APPARATUS FOR GRILLING MEAT OR THE LIKE

[75] Inventors: M. A. M. Halters, Bavel; A. S. Verwijmeren, Prinsenbeek, both of Netherlands

[73] Assignee: Eurogrill B.V., Prinsenbeek, Netherlands

[21] Appl. No.: 595,903

[22] Filed: Apr. 2, 1984

[30] Foreign Application Priority Data

Sep. 7, 1983 [NL] Netherlands .................... 8303095

[51] Int. Cl.⁴ ............................................. A47J 37/04
[52] U.S. Cl. .................... 99/421 H; 99/341; 99/446; 99/447; 126/21 A; 219/400
[58] Field of Search .............. 99/401, 447, 421 R, 99/421 H, 446, 341; 219/400; 126/21 A

[56] References Cited

U.S. PATENT DOCUMENTS

| | | | |
|---|---|---|---|
| 3,327,616 | 6/1967 | Ozymy | 99/421 H X |
| 3,783,219 | 1/1974 | Tateda | 219/400 X |
| 4,132,216 | 1/1979 | Guibert | 99/447 X |
| 4,350,874 | 9/1982 | Nishikawa | 126/21 A X |
| 4,374,319 | 2/1983 | Guibert | 219/400 |
| 4,386,558 | 6/1983 | Holman | 99/401 X |
| 4,395,233 | 7/1983 | Smith | 99/447 X |

FOREIGN PATENT DOCUMENTS

2405951 8/1975 Fed. Rep. of Germany ... 99/421 H
2753827 6/1979 Fed. Rep. of Germany ........ 99/447

OTHER PUBLICATIONS

Consumer Reports (Farberware) pp. 644–646, Nov. 1979.

*Primary Examiner*—Billy J. Wilhite
*Attorney, Agent, or Firm*—Daniel C. McKown

[57] ABSTRACT

An apparatus for grilling meat and the like comprising an assembly for one or more sets of fan blades 11 to be driven by a motor 10 arranged outside the grilling space 2 and elements 13 heating the air so that a hot air flow can be maintained inside the grilling space around the meat supported on rotating spits 3, the temperature of said air flow being sufficient to cook said meat, heat radiators being provided in the grilling space for superficially scorching the supported meat.

2 Claims, 2 Drawing Figures

APPARATUS FOR GRILLING MEAT OR THE LIKE

Although, strictly speaking, a grill is a flat heated surface, contemporary usage condones a second meaning. An apparatus on which food is barbecued is commonly referred to as a barbecue grill. From this, there has developed a tendency by many people to use the work "grilling" to refer to the use of a combination of hot air and radiant heat for cooking. It is in this latter sense that the word "grilling" is used herein.

Apparatus for grilling bigger pieces of meat, poultry, in particular chickens, and the like, have been in use already for many years, in particular in food stores.

Such apparatus comprise a grilling space defined by metal walls and one or more access doors provided with a window of heat-resistant glass, motor-driven rotatable spits or similar means for supporting the meat to be grilled arranged outside said space, and heating means for heating said meat to the required temperature, said heating means being formed by, generally electric, heat radiation elements which are positioned in such a manner that the meat rotated on the spits is irradiated thereby, while by rotating said spits a substantial loss of fat can be avoided, the excess fat dripping down being collected in a drip tray provided on the bottom.

In apparatus of this type the meat can be grilled without adding fat and without a substantial desiccation since the irradiated surface is quickly scorched, which enhances the taste and juiciness of the meat, and grilling with little fat is favorable for persons desiring a low-fat diet.

Such apparatus have, as to their effect, excellently satisfied, but, in practice, some important disadvantages will be experienced. During grilling the surface of the meat is strongly locally heated. This is desirable for scorching the meat and obtaining a certain superficial burning which is characteristic for grilled meat. For internally cooking the meat a prolonged irradiation has to take place, and, as a consequence of the superficial discoloration, heat absorption increases. This prolonged irradiation of the surface has, furthermore, as a consequence that fat starts to melt out and to spatter away. The fat will then cover all the walls, and will also land on the heating elements where it is immediately charred and leaves a carbon deposit. Also the walls are irradiated and become hot accordingly, particularly if fat specks are already present thereon which, too, begin to char fully or partially. From this it follows that at the end of a working day the whole grilling space is to be thoroughly cleaned of such stuck fat and carbon residues, which may even take 2 hours in an apparatus of current dimensions.

If enamel coated walls are used instead of stainless steel walls, cleaning can be somewhat simpler, but the enamel can crack and break up so that the wall becomes quickly useless; moreover an enamel coating is expensive.

SUMMARY OF THE INVENTION

It is an object of the present invention to provide an apparatus constructed such that burning and charring of fat can be avoided therein or at least restricted very substantially.

To that end the apparatus according to the invention comprises an assembly of one or more fan blades to be driven by a motor situated outside the grilling space, and heating elements for heating the air, by means of which a hot air flow along the meat supported on the rotatable spits can be maintained within the grilling space.

In an apparatus of this kind, heating the surface of the meat occurs in the hot air flow, the heating taking place very uniformly, while the temperature can be maintained at a value which is sufficient for the effect, whereas with radiation heating the temperature depends on radiation absorption which cannot be controlled.

At such a uniform and not excessive heating, the meat will become quickly cooked internally, and less fat will spatter away, whilst fat nevertheless spatting away will be entrained by the air flow which is not so hot that the fat would be charred immediately. Moreover the walls will become less hot so that the fat can drip therealong without substantially being charred.

In order to obtain the taste of grilled meat, heat radiators are present which only serve for obtaining the surface effect, and can be of a substantially smaller power than in the current apparatus. Such radiators, therefore, will not lead to substantial spattering of fat.

In particular an air circulation space communicating with the grilling space and separated therefrom is present, which communicates with said grilling space by means of one or more inlet and outlet apertures, in which circulation space the fan blades and heating means are arranged, the circulation space preferably being situated at the upper side of the grilling space, the inlet and outlet apertures being provided in the upper boundary wall of the grilling space.

The fat collecting tray is preferably shielded against direct heating by means of inclined guide baffles directly joining the lateral walls of the grilling space, in order to counteract evaporation of the fat present therein and fume formation caused thereby.

In a preferred embodiment, the walls of the grilling space are surrounded at some distance by a substantially closed casing, the space inbetween communicating by means of apertures in said casing with the surroundings, in which space motor-driven blades are arranged, by means of which a flow of ambient air can be blown through said interspace. The motor for driving a rotatable spit and the motor of the fan for circulating hot air through the grilling space are arranged in said interspace. In the preferred embodiment, a common motor is used for driving both sets of fan blades.

In this manner it can be avoided that the hot outer wall of the grilling space will be contacted, while moreover, an additional cooling of the boundary walls of the grilling space is obtained, so that the possibility of scorching of fat is reduced still further.

DESCRIPTION OF A PREFERRED EMBODIMENT

Figure 1:
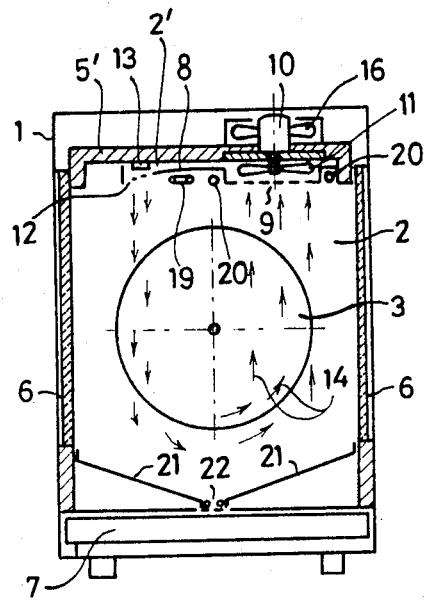
FIG. 1 is a diagrammetric side cross sectional view of a preferred embodiment of the apparatus of the present invention; and, FIG. 2 is a diagrammetric front cross sectional view thereof.
Figure 2:
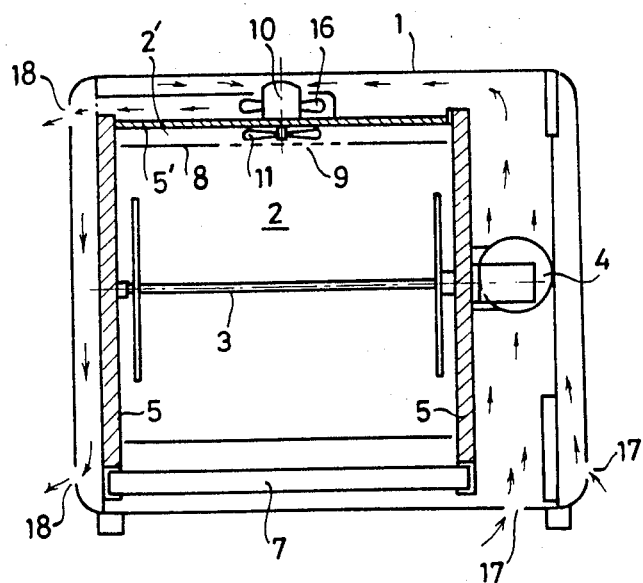

Within a casing 1 of plate metal, in particular of stainless steel, the grilling space proper 2 is provided, in which a rotatable spit 3 is arranged which can be rotated by means of an electric motor 4. The walls 5 defining the space 2 consist of stainless steel or the like, and are insulated in the usual way at their outer side; at the front and rear sides a wall 6 of heat-resistant glass is provided which, at least at the front side, is constructed as an access door. A fat collecting tray 7 is arranged below the spit 3.

At the upper side the space 2 is closed by an upper plate 8 in which a suction opening 9, if required provided with a wire screen, is present, behind which fan blades 11 driven by a motor 10 are arranged. The air sucked in by these blades from the space 2 is removed through the interspace 2' between the upper plate 8 and the upper part 5' of the insulated wall, which interspace communicates again with the space 2 by means of one or more apertures 12. Near the aperture 12 one or more heating elements 13 are arranged, by means of which the air blown into the space 2 through the aperture 12 is heated.

As indicated by arrows 14, the blades 11 maintain an air flow through the space 2 flowing around the meat supported on the rotatable spit, the heating elements 13, which can be controlled by means of a heat sensor, ensuring that the meat is maintained by the hot-air flow at the desired cooking temperature.

The motor 10 also drives a second set of blades 16 arranged in the interspace between the insulating inner wall 5' and the casing 1. In said casing apertures 17 and 18 are provided through which ambient air can be sucked into said interspace or can be blown away therefrom respectively. Thereby the outer surface of the casing is kept cool so that, when touching it, no danger of being burned exists. Moreover the wall 5 is cooled at its insulated side, which will lead to a lower temperature also at its inner side, so that fat specks landing thereon will be cooled still better, and a still smaller risk of scorching and formation of fat fumes will exist.

The hot-air flow 14 is sufficiently hot for cooking the meat, but is, generally, not hot enough for scorching the meat surface, thus obtaining the external grilling effect. For obtaining the latter effect an additional heat radiator 19 is provided at the upper side of the space 2, having a power which is sufficient for bringing about the scorching effect. This power is substantially lower than that of the radiators in the current grilling apparatus in which the radiators must also bring about the internal cooking. At this relatively small power the risk of fat spattering is much smaller, and the fat arriving on the walls will no longer or hardly be charred. Furthermore lamps 20 are arranged in the space 2 for providing the interior illumination, which lamps will, moreover, contribute to the heat radiation; in particular quartz lamps will be used for this purpose.

Above the fat collecting tray 7 a set of guide baffles 21 is arranged between which an open slot 22 is present, which guide baffles are downwardly inclined so as to divert the fat dripping from the lateral walls toward the slot 22. These baffles screen the fat in the tray 7 from the hot-air flows 14 and the radiation of the radiator 19, so as to prevent evaporation of the fat. Said baffles provide furthermore a certain guiding of the air flows 14 at the lower side of the space 2.

In practice, a temperature of up to about 250° C. is maintained in the air flow 14, but, generally, a temperature of 180° C. can be used.

It will be obvious that a number of apparatus of this type as described can be superposed or juxtaposed. It will be clear, moreover, that, instead of a rotatable spit 3 of the kind as shown, a chain spit can be arranged in the grilling space 2.

What is claimed is:

1. An apparatus for grilling food, suitable for continuous operation in commercial use, and of the type in which the food is mounted on a rotating pit inside a grilling chamber, but differing from prior grilling apparatus in that charring of liquid dripping and splattering from the food is very substantially reduced, said apparatus comprising:

walls, including an upper wall located above the food, and including lateral walls extending downward from the upper wall to a bottom, said walls and bottom collectively defining the grilling chamber;

a casing enclosing said walls but spaced from them;

an upper plate located within the grilling chamber adjacent and facing said upper wall but spaced from it;

a heating element located in the space between said upper wall and said upper plate, said upper plate shielding the food from radiation produced by said heating element, whereby excessive localized surface heating of the food is avoided;

a first fan located in the space between said upper plate and said upper wall for circulating the air within the grilling chamber first downwardly over the food, and then upwardly, and for causing a flow of air across said heating element for heating the air as it is recirculated, whereby cooking of the food is accomplished primarily by condution from the heated air rather than by radiation from said heating element;

a second fan located in the space between said casing and said walls and causing ambient air to flow through the space between said casing and said walls and carrying away heat from said walls, whereby said walls are cooled so that charring of liquids that splatter from the food onto said walls is substantially reduced;

a radiator element located in the grilling chamber above the food and producing radiation for browning the surface of the food, said radiator element being operated at relatively low power compared to said heating element since said radiator element is used merely for browning the surface of the food but is not relied on for cooking the interior of the food;

a fat collecting tray located on the bottom of the grilling chamber; and, guide baffles extending from said lateral walls into the grilling chamber and sloping downward toward said fat collecting tray, and funneling into said fat collecting tray any liquids that drip from the food while it is cooking, said guide baffles shielding substantially all of said fat collecting tray from the radiation and hot air within the grilling chamber and further serving to guide the flow of recirculating air around the food, said guide baffles being partially shielded by the food from the radiation, thereby reducing charring of liquids that drip onto said guide baffles.

2. The apparatus of claim 1 further comprising only one motor, located in the space between said casing and said walls, coupled to and driving both said first fan and said second fan.

* * * * *